UNITED STATES PATENT OFFICE.

JULES SCHMERBER AND CHARLES SCHMERBER, OF PATERSON, N. J.

PROCESS OF TREATING PYROXYLINE IN THE MANUFACTURE OF PLASTIC COMPOUNDS.

SPECIFICATION forming part of Letters Patent No. 233,558, dated October 19, 1880.

Application filed November 15, 1879.

*To all whom it may concern:*

Be it known that we, JULES SCHMERBER and CHARLES SCHMERBER, of Paterson, in the county of Passaic and State of New Jersey, have invented a new and Improved Process of Treating Pyroxyline in the Manufacture of Plastic Compounds, of which the following is a specification.

The object of our invention is to treat the nitro-derivatives of cellulose, starch, &c., to obtain a plastic composition with greater facility, rapidity, economy, and safety than heretofore; and the invention consists in the process which is set forth hereinafter.

Cotton and other forms of cellulose, starch, dextrine, &c., have been treated with nitric acid, or a mixture of nitric and sulphuric acids, or sulphuric acid and nitrate of soda or potash, by well-known processes, to obtain a soluble substance generally known as "pyroxyline."

The first part of our process consists in obtaining such nitro-derivatives, for which purpose we take cotton, linen, or cellulose in other forms, starch, or dextrine, and mix the same with nitric acid, or nitric and sulphuric acids, so as to saturate the material uniformly. After contact for a sufficient length of time the acids are drained off, the material washed to thoroughly remove the acids, and then allowed to drain for from twelve to twenty-four hours. The product thus obtained, while wet, is then treated by any known solvent, such as methylic alcohol, ethylic alcohol, sulphuric or acetic ether, or others, and with the solvents there are to be mixed gums, balsams, resins, dye-stuffs, or other suitable materials, according to the subsequent use of the compound.

The solvent may be used in the proportion of one gallon to ten pounds of the nitro-compound; but this proportion may be greatly changed without materially changing the character of the final product, and the proportion of gums and pigments is to be varied according to the color, toughness, or hardness required. The pulpy substance thus obtained is then heated in a suitable vessel at a temperature of from 150° to 220° Fahrenheit, which has the effect to render the mass semi-liquid. The next step in the process is to obtain the perfect mixture and grinding of the ingredients, which is to be accomplished by any suitable apparatus, though we prefer to use apparatus we have constructed especially for the purpose. After this mixing and grinding the compound is to be dried in any convenient way at a temperature not exceeding 150° Fahrenheit, and then while plastic molded in suitable molds to the form desired.

It is obvious that by the above-described process, when used for manufacturing compounds of which nitro-cellulose, nitro-glucose, or other nitro-derivatives form a part, the danger of ignition, either spontaneous or accidental, is avoided, as in all stages of the manufacture the above-named substances are not dried in a free state; also, that by using the nitro-derivatives in a wet state we save the long and expensive operation of drying, which requires labor, drying-rooms, and special machinery for the purpose.

Having thus described our invention, we claim as new and desire to secure by Letters Patent—

The above-described process for obtaining a plastic compound by the treatment of the nitro-derivatives of cellulose, dextrine, and glucose mixed with gums, balsams, or pigments, which consists in first treating the material while in a wet state with a liquid solvent, then reducing the product to a semi-liquid form by heat, then grinding and mixing the semi-liquid mass, and finally drying the compound to a plastic consistency, substantially as described.

JULES SCHMERBER.
CHARLES SCHMERBER.

Witnesses:
GEO. D. WALKER,
C. SEDGWICK.